(12) United States Patent  (10) Patent No.: US 8,992,049 B2
McDade et al.  (45) Date of Patent: Mar. 31, 2015

(54) LIGHT HAVING AN OMNIDIRECTIONAL AMBIENT LIGHT COLLECTOR

(71) Applicant: SPX Corporation, Charlotte, NC (US)

(72) Inventors: Nimrod McDade, Franklin, TN (US);
Russell Bruner, Franklin, TN (US);
Handani Kam, Franklin, TN (US)

(73) Assignee: SPX Corporation, Charlotte, NC (US)

( * ) Notice: Subject to any disclaimer, the term of this patent is extended or adjusted under 35 U.S.C. 154(b) by 30 days.

(21) Appl. No.: 13/973,484

(22) Filed: Aug. 22, 2013

(65) Prior Publication Data

US 2014/0056004 A1 Feb. 27, 2014

Related U.S. Application Data

(60) Provisional application No. 61/691,968, filed on Aug. 22, 2012.

(51) Int. Cl.
*F21V 23/04* (2006.01)
*F21V 23/00* (2006.01)

(52) U.S. Cl.
CPC ........................ *F21V 23/00* (2013.01)
USPC .......................................... 362/276

(58) Field of Classification Search
CPC .................................... F21V 23/0442
USPC .......................................... 362/276
See application file for complete search history.

(56) References Cited

U.S. PATENT DOCUMENTS

| | | |
|---|---|---|
| 1,292,123 A | 1/1919 | Steiger |
| 2,489,076 A | 11/1949 | Bjontegard |
| 2,709,224 A | 5/1955 | Garnick |
| 3,031,582 A | 4/1962 | Benner, et al. |
| 3,093,785 A | 6/1963 | Edgerton |
| 3,094,286 A | 6/1963 | Harling |
| 3,221,162 A | 11/1965 | Heenan et al. |
| 3,253,139 A | 5/1966 | Anderson |
| 3,349,239 A | 10/1967 | Fahey, Jr. et al. |
| 3,543,099 A | 11/1970 | Turner |
| 3,852,584 A | 12/1974 | Levin |
| 3,875,561 A | 4/1975 | Scarpino et al. |
| 3,949,211 A | 4/1976 | Elms |
| 3,961,180 A | 6/1976 | Schultz |
| 4,023,035 A | 5/1977 | Rodriguez |
| 4,527,158 A | 7/1985 | Runnels |
| 4,672,206 A | 6/1987 | Suzuki et al. |
| 4,758,767 A | 7/1988 | Blake |
| 4,767,172 A | 8/1988 | Nichols et al. |

(Continued)

OTHER PUBLICATIONS

International Search Report issued in PCT/US2013/055958 dated Feb. 7, 2014.

*Primary Examiner* — Evan Dzierzynski

(74) *Attorney, Agent, or Firm* — Baker & Hostetler LLP

(57) ABSTRACT

A light and light control system includes a light configured to generate light from a power source. The system further includes a light collector configured to receive ambient light from any one of a plurality of directions, the light collector including an outer face to receive the ambient light, the light collector including an inclined surface arranged in the light collector, at least one photo detector configured to detect the light received by the light collector, and the inclined surface redirecting the light received from the outer face towards the at least one photo detector. Finally, the system includes a circuit configured to receive a signal from the at least one photo detector and control the light in response to the signal.

20 Claims, 7 Drawing Sheets

(56) References Cited

U.S. PATENT DOCUMENTS

| | | |
|---|---|---|
| 4,791,290 A | 12/1988 | Noone et al. |
| 4,907,139 A | 3/1990 | Quiogue |
| 5,450,302 A | 9/1995 | Maase et al. |
| 5,806,965 A | 9/1998 | Deese |
| 5,899,557 A | 5/1999 | McDermott |
| 5,929,788 A | 7/1999 | Vukosic |
| 6,086,220 A | 7/2000 | Lash et al. |
| 6,183,100 B1 | 2/2001 | Suckow et al. |
| 6,322,234 B1 | 11/2001 | Drake et al. |
| 6,425,678 B1 | 7/2002 | Verdes et al. |
| 6,483,254 B2 | 11/2002 | Vo et al. |
| 6,525,668 B1 | 2/2003 | Petrick |
| 6,543,911 B1 | 4/2003 | Rizkin et al. |
| 6,554,441 B2 | 4/2003 | Rohlfing et al. |
| 6,572,249 B2 | 6/2003 | Bailey |
| 6,598,998 B2 | 7/2003 | West et al. |
| 6,667,582 B1 | 12/2003 | Procter |
| 6,695,462 B2 | 2/2004 | Rohlfing et al. |
| 6,899,443 B2 | 5/2005 | Rizkin et al. |
| 6,905,228 B1 | 6/2005 | Takeyasu et al. |
| 6,932,496 B2 | 8/2005 | Rizkin et al. |
| 6,948,830 B1 | 9/2005 | Petrick |
| 6,951,418 B2 | 10/2005 | Rizkin et al. |
| 6,988,815 B1 | 1/2006 | Rizkin et al. |
| 6,989,768 B2 | 1/2006 | DeMarco et al. |
| 6,991,351 B1 | 1/2006 | Petrick |
| 7,014,337 B2 | 3/2006 | Chen |
| 7,016,802 B2 | 3/2006 | Flaherty |
| 7,040,786 B2 | 5/2006 | Ganzer et al. |
| 7,079,041 B2 | 7/2006 | Fredericks et al. |
| 7,111,961 B2 | 9/2006 | Trenchard et al. |
| 7,192,155 B2 | 3/2007 | Morrow et al. |
| 7,208,881 B2 | 4/2007 | Young |
| 7,217,006 B2 | 5/2007 | Trenchard et al. |
| 7,252,405 B2 | 8/2007 | Trenchard et al. |
| 7,357,530 B2 | 4/2008 | Wang et al. |
| 7,378,983 B2 | 5/2008 | Wang et al. |
| 7,407,303 B2 | 8/2008 | Wanninger et al. |
| 7,497,593 B2 | 3/2009 | Wang |
| 7,503,669 B2 | 3/2009 | Rizkin et al. |
| 7,547,876 B2 | 6/2009 | Flaherty |
| 7,568,821 B2 | 8/2009 | Peck et al. |
| 7,569,802 B1 | 8/2009 | Mullins |
| 7,572,030 B2 | 8/2009 | Booth et al. |
| 7,581,854 B2 | 9/2009 | Ford |
| 7,604,380 B2 | 10/2009 | Burton et al. |
| 7,619,234 B2 | 11/2009 | Thorsted |
| 7,641,361 B2 | 1/2010 | Wedell et al. |
| 7,645,053 B2 | 1/2010 | Machi et al. |
| 7,686,481 B1 | 3/2010 | Condon et al. |
| 7,712,922 B2 | 5/2010 | Hacker et al. |
| 7,712,931 B1 | 5/2010 | Smith |
| 7,722,215 B2 | 5/2010 | Ward et al. |
| 7,726,846 B2 | 6/2010 | Yang et al. |
| 7,731,384 B2 | 6/2010 | Curran et al. |
| 7,758,210 B2 | 7/2010 | Peck |
| 7,794,124 B2 | 9/2010 | Hulsey et al. |
| 7,804,251 B2 | 9/2010 | Wang |
| 7,810,968 B1 | 10/2010 | Walker et al. |
| 7,832,908 B2 | 11/2010 | Peck et al. |
| 7,841,743 B2 | 11/2010 | Wang et al. |
| 7,880,637 B2 | 2/2011 | Weiss |
| 7,995,882 B2 | 8/2011 | Wanninger et al. |
| 8,033,683 B2 | 10/2011 | Fields |
| 8,066,400 B2 | 11/2011 | Curran et al. |
| 8,083,382 B1 | 12/2011 | Sebek |
| 8,096,677 B2 | 1/2012 | Fields et al. |
| 8,138,941 B2 | 3/2012 | Smith et al. |
| 8,143,568 B2 | 3/2012 | Flaherty |
| 8,177,597 B2 | 5/2012 | Kolb |
| 8,220,959 B2 | 7/2012 | Rizkin et al. |
| 2002/0122309 A1 | 9/2002 | Abdelhafez et al. |
| 2002/0145533 A1 | 10/2002 | Bushell et al. |
| 2004/0218391 A1 | 11/2004 | Procter |
| 2005/0146875 A1 | 7/2005 | Klein |
| 2006/0083017 A1 | 4/2006 | Wang et al. |
| 2006/0120083 A1 | 6/2006 | Trojanowski et al. |
| 2006/0132323 A1 | 6/2006 | Grady |
| 2006/0176702 A1 | 8/2006 | Shen et al. |
| 2006/0198141 A1* | 9/2006 | Peck et al. ............ 362/247 |
| 2006/0266838 A1 | 11/2006 | Vinogradov et al. |
| 2006/0268549 A1 | 11/2006 | Oehlke |
| 2007/0164875 A1 | 7/2007 | Fredericks et al. |
| 2008/0192480 A1 | 8/2008 | Rizkin et al. |
| 2009/0073697 A1 | 3/2009 | Peck et al. |
| 2009/0219715 A1 | 9/2009 | Peck et al. |
| 2010/0027281 A1 | 2/2010 | Waters et al. |
| 2010/0091507 A1 | 4/2010 | Li et al. |
| 2010/0123397 A1 | 5/2010 | Tian et al. |
| 2010/0220478 A1* | 9/2010 | Fields et al. ............ 362/237 |
| 2010/0259929 A1 | 10/2010 | Henri et al. |
| 2010/0294961 A1 | 11/2010 | Ashdown |
| 2011/0018439 A1 | 1/2011 | Fabbri et al. |
| 2011/0121734 A1 | 5/2011 | Pape |
| 2011/0235322 A1 | 9/2011 | Fields et al. |
| 2011/0305014 A1 | 12/2011 | Peck |
| 2012/0039071 A1 | 2/2012 | Curran et al. |
| 2012/0182730 A1 | 7/2012 | Datz et al. |

\* cited by examiner

LIGHT HAVING AN OMNIDIRECTIONAL AMBIENT LIGHT COLLECTOR

CROSS REFERENCE TO PRIOR APPLICATIONS

This application claims the benefit from U.S. Provisional Application No. 61/691,968 filed on Aug. 22, 2012 which is hereby incorporated by reference in its entirety.

BACKGROUND OF THE DISCLOSURE

1. Field of the Disclosure

This disclosure is directed to a light having a device for controlling operation based on ambient light, and, more particularly to a light having a device for controlling operation based on ambient light that includes omnidirectional light collection.

2. Related Art

Many lighting devices operate utilizing multiple operating modes. For example, many lights such as streetlights have a night mode in which they operate and a day mode in which they do not operate. Similarly, obstruction lights, which are lights arranged at the top of a tall buildings, towers, or the like operate in a first mode emitting a first color light during daylight hours and operate in a second mode emitting a different color light during night hours.

One of the approaches to controlling operation and/or modes of such lights is to utilize a light detector. Such light detectors are typically arranged on an upper portion of the light structure and the light detection portion is positioned and/or directed toward the North by the installation personnel. This ensures that the light detector will properly receive ambient light and control the light for consistent operation. However, if the light detector is incorrectly installed, or its arrangement is modified, the light detector will fail to reliably detect the ambient light and fail to properly change modes.

In a particular aspect, obstruction lights are required to be installed at the top of wind turbines. Wind turbines present an additional problem as they rotate 360° in order for the wind turbine to be correctly orientated with respect to the prevailing winds. This ensures that the wind turbine operates with the highest efficiency generating the greatest amount of power. The problem with this movement is that an obstruction light mounted to the top of the wind turbine and its associated light detector moves. This means that the light detector is only occasionally pointing north and the ambient light that is collected may not correctly control the particular mode of operation of the obstruction light.

Accordingly, there is a need for a light and light detector that is able to operate more reliably in various implementations.

SUMMARY OF THE DISCLOSURE

According to an aspect of the disclosure, a light and light control system includes a light configured to generate light from a power source, a light collector configured to receive ambient light from any one of a plurality of directions, the light collector including an outer face to receive the ambient light, the light collector comprising an inclined surface arranged in the light collector, at least one photo detector configured to detect the light received by the light collector, the inclined surface redirecting the light received from the outer face towards the at least one photo detector, and a circuit configured to receive a signal from the at least one photo detector and control the light in response to the signal.

According to a further aspect of the disclosure, a light and light control system includes a light configured to generate light from a power source, a light collector configured to receive ambient light from any one of a plurality of directions, the light collector including a substantially vertical outer face to receive the ambient light, the light collector comprising an inclined surface arranged in the light collector, at least one photo detector configured to detect the light received by the light collector, the inclined surface reflecting the light received from an outer face towards the at least one photo detector, and a circuit configured to receive a signal from the at least one photo detector and control the light in response to the signal.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
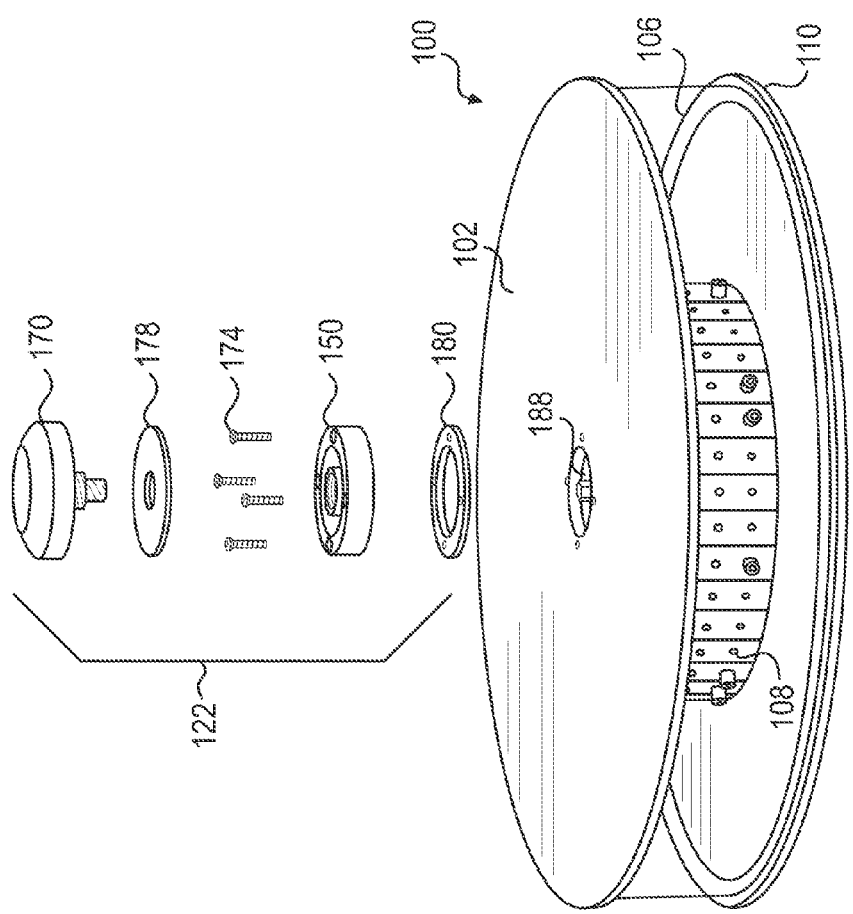
FIG. 1 shows an exploded view of a light collector device together with an obstruction light.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

A solution was developed that collects light from all directions and redirects it to a light sensor. The solution includes a sensor that has a clear or semi-clear material that may be shaped into a disk or the like with a concentric grove cut or otherwise formed into one or more faces. The groove angle may be configured to provide a total internal reflective surface at a transition between the material and air. Therefore, light is collected from all directions at the edges of the disk and may be redirected through the face of the disk.

A light sensor can be placed and directed at the face of the disk to detect ambient light from all directions. The light sensor can be placed directly on a circuit board, such as printed circuit board, so that no additional wiring is required to incorporate the light detection system.

FIG. 1 shows an exploded view of the light collector device together with an obstruction light. In particular, a light collector device 122 includes a light collector 150. The light collector 150 may be mounted on top of an obstruction light 100. The light collector 150 may be mounted on other locations of the obstruction light 100 as well. Moreover, the light collector 150 may be mounted at a separate location and provide control signals to one or more obstruction lights 100 for control of the same.

The light collector device 122 may further include a gasket 180 arranged between the light collector 150 and a top plate 102 of the obstruction light 100. The gasket 180 may prevent intrusion of water and the like into the obstruction light 100 and the light collector device 122. Similarly, a gasket 178 may be arranged on top of the light collector 150. The gasket 178 may prevent intrusion of water and the like into the obstruction light 100 and the light collector device 122.

The light collector 150 may be mechanically fastened to the top plate 102 of the obstruction light 100 by any known means. In particular, one or more mechanical fasteners 174 may extend through the light collector 150 to mechanically fasten the light collector 150 to the obstruction light 100. However, it is contemplated that the light collector 150 may be attached to the obstruction light 100 with any type of fastening.

The light collector device 122 may further include a cap 170. The cap 170 may prevent intrusion of water and the like into the obstruction light 100 and the light collector device 122. Additionally, the cap 170 may also house an antenna for wireless reception and transmission utilizing communication channels. In particular, the cap 170 may house a global navigation satellite system (GNSS) antenna. However, the light collector device 122 may be configured without a cap 170 and the light collector device 122 may be configured to operate accordingly.

The light collector device 122 may be mounted over a hole 188 arranged on the obstruction light 100. The hole 188 may be configured to receive light collected by the light collector 150. Moreover, the hole 188 of the obstruction light 100 may include a light detector and controller arranged therein as described in further detail below. Alternatively, the light collector device 122 may include the light detector and/or controller integrated therein. In yet a further alternative, the light collector device 122 may include the light detector and/or controller integrated in a separate housing.

The light collector device 122 may be utilized with any type of lighting device. The particular obstruction light 100 shown in FIG. 1 that includes a top plate 102, a lens 106, a bottom plate 110, and a core 108 is simply exemplary. Other types of lights may be utilized with the light collector device 122 including street lights, house lights, accent lights, and the like.

Figure 2:
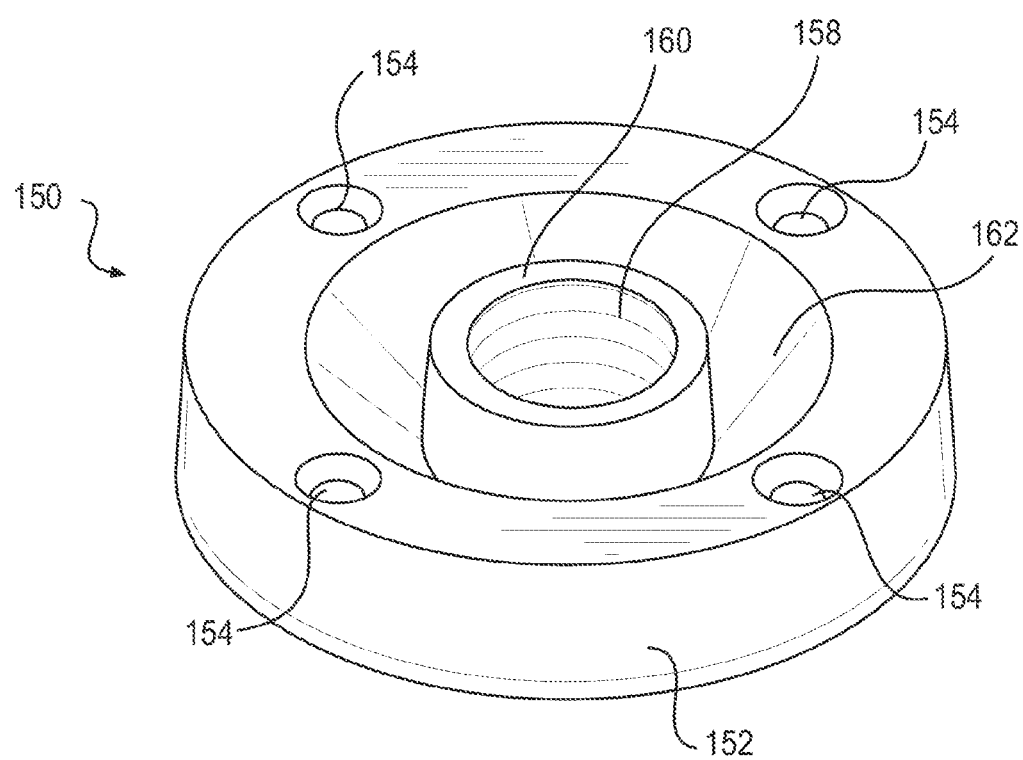
FIG. 2 shows a light collector of the light collector device of FIG. 1.

FIG. 2 shows a light collector of the light collector device of FIG. 1. The light collector 150 may be formed from any optically rated materials that include clear plastics, plexiglass acrylic materials, polycarbonate materials, and the like. The material may be transparent or translucent. The light collector 150 may be molded and/or machined. In particular, the light collector 150 may be injection molded.

The light collector 150 may be disk shaped having an outer face 152. The outer face 152 may be polished. Moreover, the outer face 152 may be inclined 1 to 10° from the vertical and more specifically 1 to 5° from the vertical. The light collector 150 may include an inclined surface 162 that is part of a groove in the light collector 150. The surface of the inclined surface 162 may be polished. The inclined surface 162 may be inclined 20 to 70° from the vertical and more specifically 30 to 60° from the vertical.

In some aspects, the light collector 150 may include one or more fastener holes 154 to allow a fastener 174 to extend through for attachment of the light collector 150 to an obstruction light 100. However, as previously noted, other attachment configurations are contemplated and are within the spirit and scope of the invention. Accordingly, some aspects may not include fastener holes 154.

In some aspects, the light collector 150 may include an attachment hole 158 configured to attach the cap 170. The attachment hole 158 may include threads 160 to allow fastening of the cap 170 to the light collector 150. However, as previously noted, other configurations are contemplated and are within the spirit and scope of the invention. Accordingly, some aspects may not include an attachment hole 158 and/or threads 160.

Figure 3:
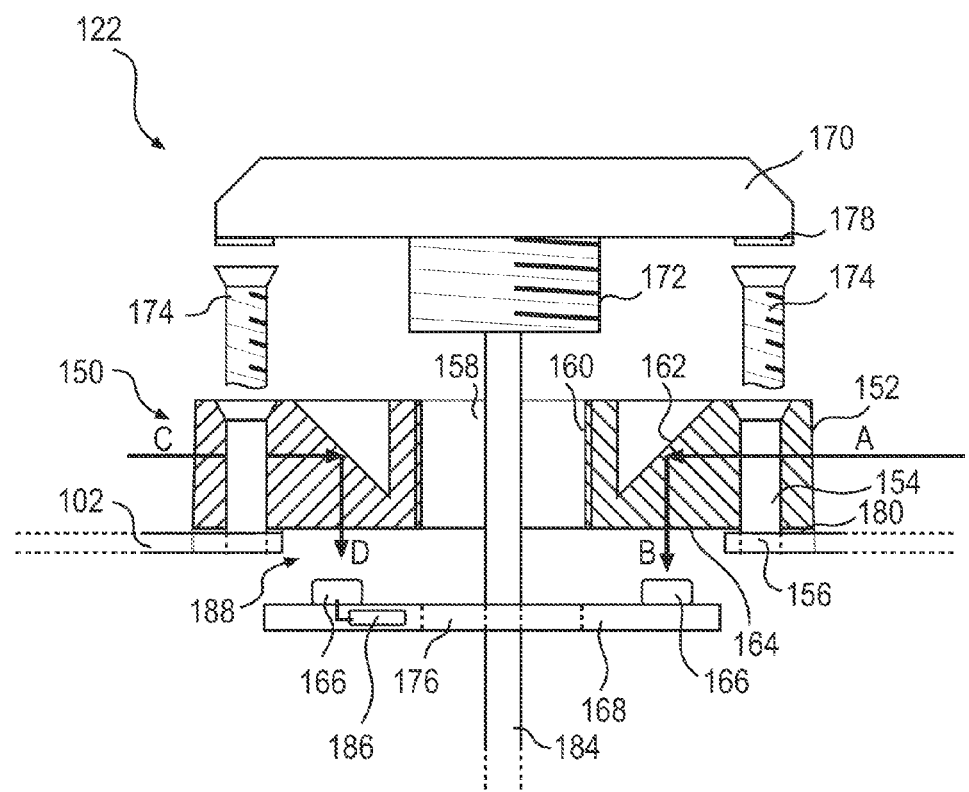
FIG. 3 shows a partial exploded view of the light collector device of FIG. 1 and partially shows the obstruction light of FIG. 1.

FIG. 3 shows a partial exploded view of the light collector device of FIG. 1 and partially shows the obstruction light of FIG. 1. In particular, FIG. 3 shows a cross-sectional view of the light collector 150, and side views of the cap 170, a partial view of the top plate 102 and a side view of a circuit board 168.

As shown in FIG. 3, ambient light may enter the outer face 152 of the light collector 150 as shown by arrow A. In this case, the light collector 150 may be arranged such that sun is on the right side. The light will continue through the light collector 150 along the path generally shown by arrow A until it reaches the inclined surface 162. Thereafter, the inclined surface 162 may redirect the light to the photo detector 166 as shown by arrow B. In this regard, the inclined surface 162 may provide a total internal reflective surface at a transition between the material of the inclined surface 162 and air (above the inclined surface 162) to provide the redirection shown between arrow A and arrow B. Alternatively, the inclined surface 162 may use other physical properties to provide the redirection shown between arrow A and arrow B including a mirrored surface to provide reflection or the like.

As further shown in FIG. 3, ambient light may enter the outer face 152 of the light collector 150 as shown by arrow C. In this case, the light collector 150 may be arranged such that sun is on the left side. The light will continue through the light collector 150 along the path generally shown by arrow C until it reaches the inclined surface 162. Thereafter, the inclined surface 162 may redirect the light to the photo detector 166 as shown by arrow D.

Furthermore, ambient light may enter the outer face 152 of the light collector 150 at any point. The light will continue through the light collector 150 until it reaches the inclined surface 162. Thereafter, the inclined surface 162 may redirect the light to any one of the plurality photo detectors 166.

As further shown in FIG. 3, the cap 170 may include a threaded attachment shaft 172 that may extend into the attachment hole 158 and cooperate with the threads 160 in the attachment hole 158. However, it is contemplated that the cap 170 may attach to the light collector 150 in any of a number of different ways. Furthermore, as noted above, cap 170 is optional and is not necessary for implementation of the invention. If the cap 170 includes an antenna, wires 184 may extend through the attachment shaft 172 for connection within the obstruction light 100. The wires 184 may connect to the circuit board 168 or may extend through a hole 176 in the circuit board 168 to connect to another portion of the obstruction light 100 and to provide and/or receive signals associated with the antenna.

The fasteners 174 may extend through the fastener holes 154 in the light collector 150 and through holes 156 in the top plate 102 to mechanically fasten the light collector 150 to the top plate 102. For example, the fastener holes 156 may be threaded. Of course other types of fastening approaches are contemplated as noted above.

The circuit board 168 may be arranged in the hole 188 of the obstruction light 100. The circuit board 168 may include one or more photo detectors 166. The photo detectors 166 may be arranged to receive light from the light collector 150. The photo detector 166 may be implemented as photodiodes, photocells, photo sensors, charge coupled devices, or the like. The output of the photo detectors 166 may be input to the circuit board 168 or other controller. The input to the circuit board 168 may be processed by an analog to digital converter or similar signal processing in order to provide a signal indicative of the ambient light received by the photo detectors 166. In this regard, the circuit board 168 or associated controller may receive the output from the photo detectors 166 to determine the level of ambient light received by the light collector 150 to determine whether to change the operational mode of the associated obstruction light 100. The circuit board 168 or associated controller may include a processor, random access memory, read-only memory, output drivers, relays, comparators, and the like for performing this operation as indicated by reference numeral 186. The random access memory may include software to execute the process of determining the amount of ambient light and the subsequent control of the obstruction light 100 based on the ambient light detected by the photo detectors 166.

Figure 4:
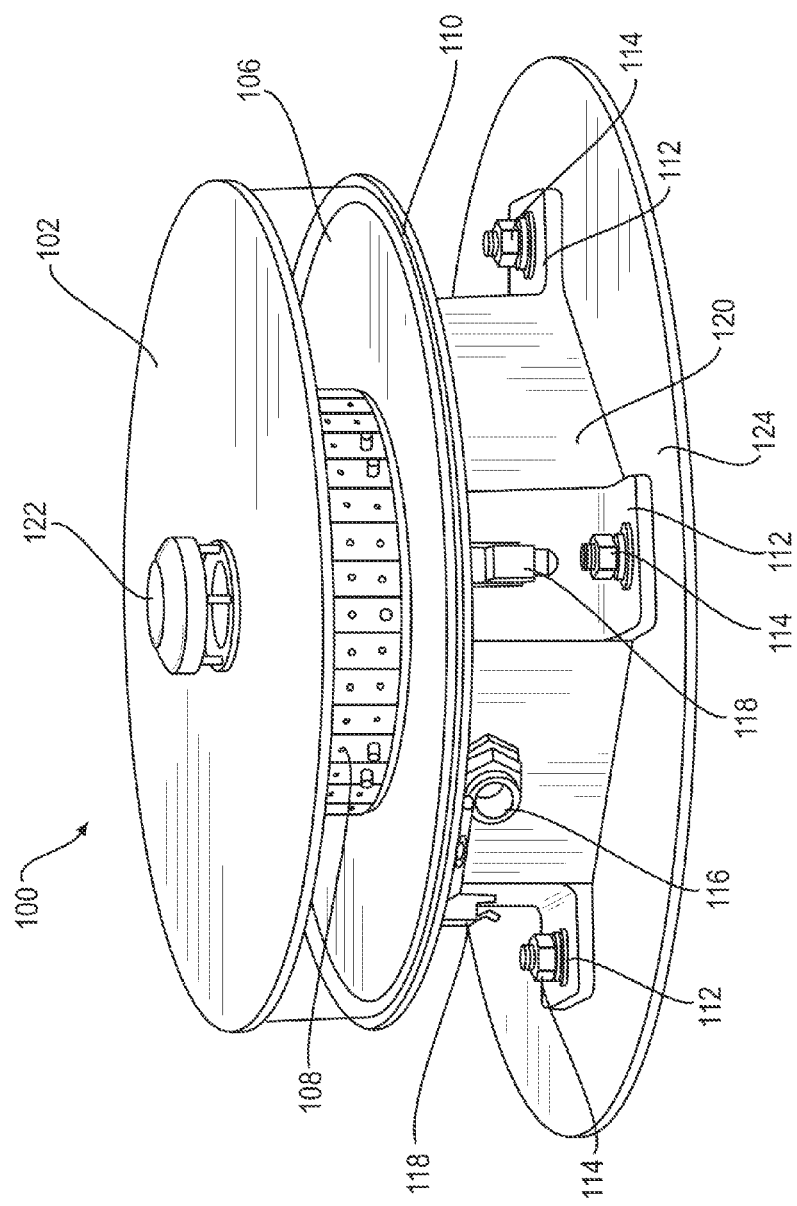
FIG. 4 shows an obstruction light constructed in accordance with the principles of the invention.
Figure 5:
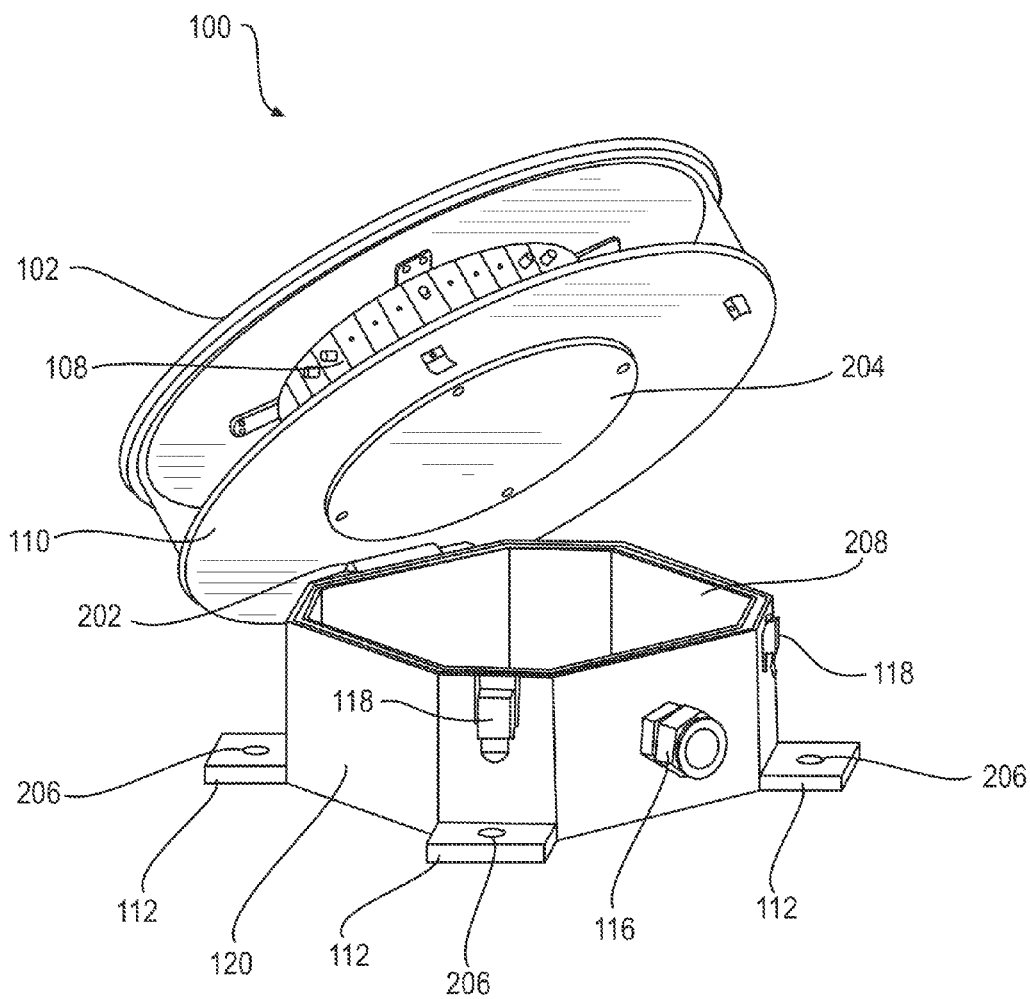
FIG. 5 shows the obstruction light of FIG. 4 in an open position.
Figure 6:
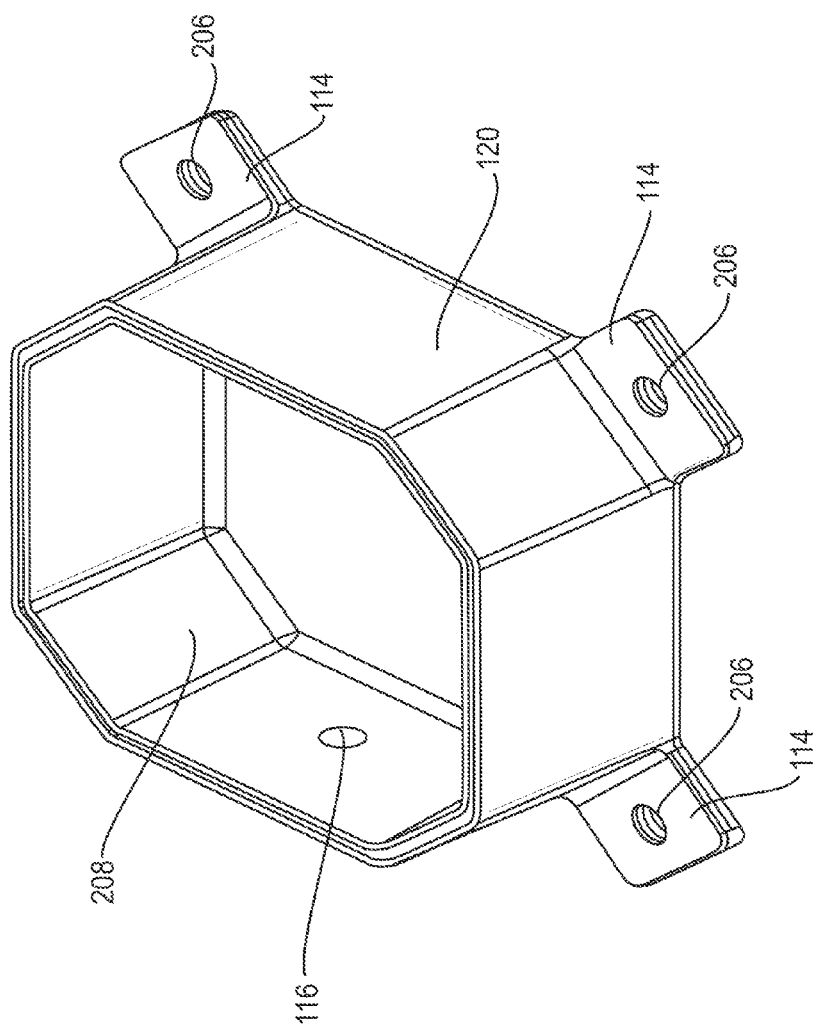
FIG. 6 shows a base of the obstruction light of FIG. 4.

FIG. 4 shows an obstruction light constructed in accordance with the principles of the invention; FIG. 5 shows the obstruction light of FIG. 4 in an open position; and FIG. 6 shows a base of the obstruction light of FIG. 4. In particular, FIGS. 4, 5, and 6 show an exemplary light 100 that may be implemented with the light collector device 122. The light collector device 122 may sense the ambient light and control operation of the light 100 based on the same as described above.

More specifically, FIG. 4 shows optics for the obstruction light 100 that are configured to capture and direct light from multiple light emitting diode sources into a 360° horizontal beam pattern and further configured to capture and direct light from the multiple light emitting diode sources into a predetermined vertical beam pattern. The optics provide a substantially even light distribution over the 360° horizontal beam pattern and substantially even light distribution over the predetermined vertical beam pattern. The predetermined vertical beam pattern may be configured to direct light along an optical axis with a beam spread of less than 20° in a direction perpendicular to the central light-emitting axis of each one of the plurality of LEDs. In a particular aspect, the predetermined vertical beam pattern may be 10°. In a further particular aspect, the predetermined vertical beam pattern may be less than 6°. In yet a further aspect, the predetermined vertical beam pattern may be 3°. Moreover, the optics are configured to provide very little stray or wasted light outside of this predetermined vertical beam pattern. Of course other horizontal and vertical beam patterns are contemplated by the invention. Moreover, other types of light sources other than light emitting diode are further contemplated. Finally, the horizontal beam pattern may be configured to provide less than 360° if desired in the particular application. For example, if multiple lights are utilized, then less than 360° of horizontal beam may be desired or appropriate.

In particular, FIG. 4 shows the obstruction light 100 having a top plate 102 that may be constructed of a metallic or other material to provide weather resistance or protection from the environment to the internal components of the light 100. The top plate 102 may provide heat dissipation generated by the internal components. A bottom plate 110 may also be constructed of a metallic or other material and provide weather resistance or protection from the environment to the internal components of the light 100 as well. Arranged between the top plate 102 and the bottom plate 110 is a lens 106 providing the above-noted optic functionality. The optic functionality is described in greater detail below. Further, between the top plate 102 and the bottom plate 110 is a core 108 that includes a plurality of light emitting diodes.

The bottom plate 110 may be arranged on a base 120. The base 120 may include various electrical connections to the light 100. In particular, within the base 120 may be located a space 208 (shown in FIG. 5) to allow installers or maintenance personnel to connect, test, repair, and so on electrical and data lines connected to the light 100. This space 208 providing weather and environmental protection to these lines and their associated connections (not shown). The base 120 may be attached to a tower, tall building, or like structure 124. In order to provide the attachment to such a structure 124, the base 120 may include mounting structure either inside the base 120 or external to the base 120.

In one aspect, the base 120 may include mounts 112. As shown in FIG. 4, there may be four mounts 112 (only three mounts are shown). Of course any number of mounts 112 are contemplated in fastening the base 120 to a structure 124. The mounts 112 may be tabs extending from the base 120. The mounts 112 may include an aspect to allow for a mechanical fastener to secure the light 100 to the structure 124. The base 120 may be formed of metallic or other material. In a particular aspect, the base 120 may be cast metal material. The mounts 112 may be formed in the casting process of the base 120. Of course other constructions are contemplated as well. In a particular aspect, the mounts 112 may include a hole to receive a mechanical fastener 114. Other types of mechanical fastening of the base 120 to a structure 124 are contemplated as well.

The base may further include a strain relief 116. The strain relief 116 may be configured to receive the electrical and/or data lines or a conduit containing the same. The construction of the strain relief 116 may be to limit intrusion of water or other environmental contaminants to the light 100, conduit, or the like.

The base 120 may further include fasteners 118 to connect and hold the bottom plate 110 to the base 120. The fasteners 118 may take the form of a type of mechanical fastener. In the implementation shown in FIG. 4, the fasteners 118 may be spring-loaded pivotal fasteners arranged on the base 120 and that associate with a hook arranged on the bottom plate 110.

As shown in FIG. 5, the light 100 may include a pivot 202 connected between the bottom plate 110 and the base 120. The pivot 202 may be a hinge or similar structure. The pivot 202 may allow the top plate 102, core 108, bottom plate 110, lens 106, and the like to rotate up and away from the base 120 to allow an installer or maintenance personnel to gain access to the space 208 for installation and repair purposes. The fasteners 118, not shown in FIG. 5, may hold the top plate 102, core 108, bottom plate 110, lens 106, and the like to the base 120.

Figure 7:
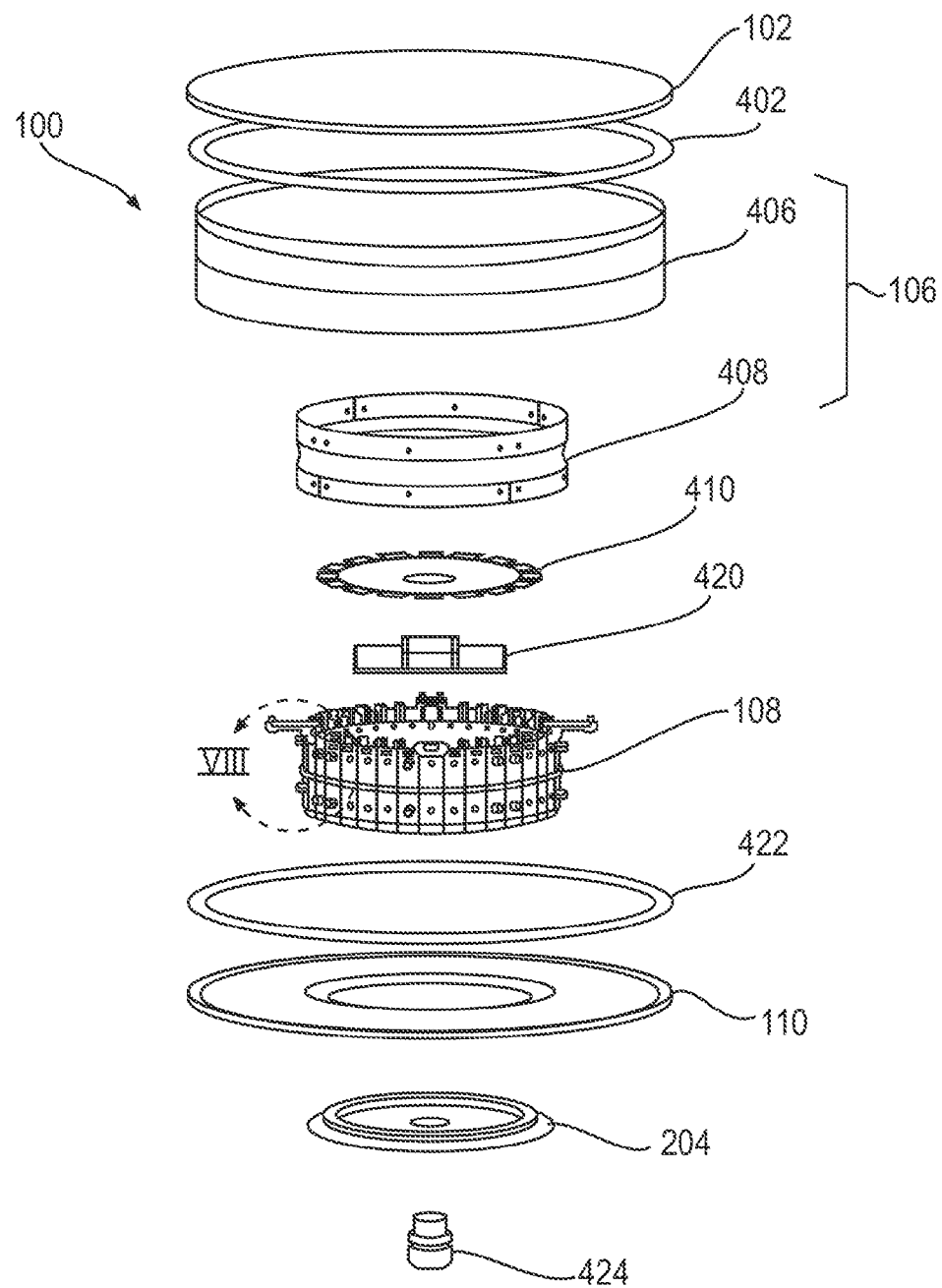
FIG. 7 shows an exploded view of the obstruction light of FIG. 4.

FIG. 7 shows an exploded view of the obstruction light of FIG. 4. In particular, FIG. 7 shows the details of the lens 106. The vertical height and diameter of the lens 106 are minimized while maintaining the optical requirements of a 360° horizontal beam pattern and a 3° vertical beam pattern. The lens 106 may include two circular ring shaped lenses 406, 408. An inner lens 408 (primary) is placed very close to a horizontal polar array of light emitting diodes that are mounted on the core 108. A larger diameter outer lens 406 (secondary) may be placed in the horizontal plane of the light emitting diodes and inner lens 408.

FIG. 7 further shows a gasket 402 arranged between the top plate 102 and an outer lens 406. The gasket 402 sealing a connection between the top plate 102 and the outer lens 406 and protecting the internal components of the light 100 from the environment. Similarly, a gasket 422 is arranged between the bottom plate 110 and the outer lens 406 for the same purpose.

FIG. 7 further shows the core 108 that may be arranged on the top plate 102. Arranged within the core 108 may be a printed circuit board mother board 410 and a printed circuit board core board 420. Both the mother board 410 and the core board 420 receiving power and/or data to drive the light emitting diodes associated with the core 108. The data and/or power lines may be received through, for example, the strain relief 116 shown in FIG. 4. The data and/or power lines may extend through the space 208 shown in FIG. 5, and may extend up through a cover 204 through a cord connector 424. Subsequently, data and/or power lines may connect to the mother board 410 and/or the core board 420.

Accordingly, the light collector device 122 collects light from all directions and redirects it to the light sensor. This greatly reduces the chances of the light collector device 122 incorrectly operating the obstruction light 100 or the like.

The invention may include communication channels associated with the antenna. The communication channels may be associated with a satellite navigation system with global coverage referred to herein as a global navigation satellite system (GNSS). The GNSS may include the United States NAVSTAR Global Positioning System (GPS), the Russian GLONASS system, Chinese Beidou navigation system, the European Union's Galileo positioning system or the like. The communication channels may also be associated with any type of wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO) and/or the like, and/or a combination of two or more thereof.

The circuit board and/or controller of the invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

It should also be noted that the software implementations associated with the circuit board and/or controller of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A light and light control system comprising:
a light configured to generate light from a power source;
a light collector configured to receive ambient light from any one of a plurality of directions;
the light collector including an outer face to receive the ambient light;
the light collector comprising an inclined surface arranged in the light collector;
at least one photo detector configured to detect the light received by the light collector;
the inclined surface redirecting the light received from the outer face towards the at least one photo detector; and
a circuit configured to receive a signal from the at least one photo detector and control the light in response to the signal.

2. The light and light control system according to claim 1 wherein the inclined surface is arranged in a groove of the light collector.

3. The light and light control system according to claim 1 wherein the inclined surface is configured to provide a total internal reflective surface at a transition between the inclined surface and air.

4. The light control system according to claim 1 wherein the light collector comprises a substantially disk shape with the outer face arranged on a circumference thereof.

5. The light and light control system according to claim 1 wherein the at least one photo detector is arranged vertically below the light collector.

6. The light and light control system according to claim 1 wherein the inclined surface comprises a circular configuration.

7. The light and light control system according to claim 1 wherein the at least one photo detector comprises a plurality of photo detectors.

8. The light and light control system according to claim 1 wherein the at least one photo detector is arranged vertically below the inclined surface.

9. The light and light control system according to claim 1 wherein the light comprises:
   a plurality of light emitting diodes; and
   a lens comprising optics configured to capture and direct light from the plurality light emitting diodes.

10. The light and light control system according to claim 1 wherein the light further comprises:
    a plurality of light emitting diodes; and
    driving circuits for the plurality of light emitting diodes.

11. A light and light control system comprising:
    a light configured to generate light from a power source;
    a light collector configured to receive ambient light from any one of a plurality of directions;
    the light collector including a substantially vertical outer face to receive the ambient light;
    the light collector comprising an inclined surface arranged in the light collector;
    at least one photo detector configured to detect the light received by the light collector;
    the inclined surface reflecting the light received from an outer face towards the at least one photo detector; and
    a circuit configured to receive a signal from the at least one photo detector and control the light in response to the signal.

12. The light and light control system according to claim 11 wherein the inclined surface is arranged in a groove of the light collector.

13. The light and light control system according to claim 11 wherein the inclined surface is configured to provide a total internal reflective surface at a transition between the inclined surface and air.

14. The light and light control system according to claim 11 wherein the light collector comprises a substantially disk shape with the outer face arranged on a circumference thereof.

15. The light and light control system according to claim 11 wherein the at least one photo detector is arranged vertically below the light collector.

16. The light and light control system according to claim 11 wherein the inclined surface comprises a circular configuration.

17. The light control system according to claim 11 wherein the at least one photo detector comprises a plurality of photo detectors.

18. The light and light control system according to claim 11 wherein the at least one photo detector is arranged vertically below the inclined surface.

19. The light and light control system according to claim 11 wherein the light comprises:
    a plurality of light emitting diodes; and
    a lens comprising optics configured to capture and direct light from the plurality light emitting diodes.

20. The light and light control system according to claim 11 wherein the light further comprises:
    a plurality of light emitting diodes; and
    driving circuits for the plurality of light emitting.

* * * * *